United States Patent [19]

Kitahama et al.

[11] Patent Number: 4,904,232
[45] Date of Patent: Feb. 27, 1990

[54] POWER TRANSMISSION BELT

[75] Inventors: Koji Kitahama; Toshimi Kumasaki, both of Kobe, Japan

[73] Assignee: Mitsuboshi Belting, Ltd., Kobe, Japan

[21] Appl. No.: 265,004

[22] Filed: Oct. 31, 1988

[51] Int. Cl.⁴ .............................................. F16G 1/08
[52] U.S. Cl. .................................... 474/238; 474/266
[58] Field of Search ............... 474/237, 266, 238, 249, 474/252, 263, 265, 268; 428/295–298, 293; 156/137–142

[56] References Cited

U.S. PATENT DOCUMENTS 4,047,446 9/1977 Speer ............................. 474/263 X
4,773,895 9/1988 Takami et al. ...................... 474/238

FOREIGN PATENT DOCUMENTS 0086648 5/1982 Japan .................................. 474/238
150039 6/1984 Japan .

Primary Examiner—Thuy M. Bui
Attorney, Agent, or Firm—Wood, Dalton, Phillips, Mason & Rowe

[57] ABSTRACT

A multiribbed power transmission belt having an inner portion of the compression section thereof defined by arcuate side surfaces converging inwardly. In one form, the side surfaces are circular. The outer portion of the compression section is defined by planar side surfaces converging inwardly. In one embodiment, the outer portion side surfaces are tangent to the inner portion arcuate surfaces and, in another form, the outer portion planar side surfaces intersect the arcuate side surfaces of the inner portion of the compression section. The distal tip of the ribs, in one form, is circular concentric with the side surfaces of the inner portion. In an alternative disclosed form, the tip surface is planar transversely to the rib.

13 Claims, 4 Drawing Sheets

DIAMETER OF BACKSIDE PULLEY (mm)

POWER TRANSMISSION BELT

TECHNICAL FIELD

This invention relates to power transmission belts and in particular to power transmission belts having a plurality of transversely spaced, longitudinally extending ribs.

BACKGROUND ART

In one form of multiribbed power transmission belt, a problem has arisen in that cracks tend to form in the ribs extending inwardly from the tip to the root of the ribs, such as when the belt is reversely bent in the drive system.

It is conventional in such prior art belts to provide distributed short fibers oriented transversely to th longitudinal extent of the belt and distributed in the rib portion.

One attempted solution to this problem has been the provision of a rib construction wherein the inner portion of the rib is formed to have a lower hardness than the outer portion thereof adjacent the cushion rubber layer carrying the tensile cords of the belt.

While the provision of the softer inner rubber tends to prevent the undesirable crack formation, the soft rubber tends to wear rapidly in engagement with the confronting surfaces of the pulley grooves. Further, the engagement of the inner portion of the ribs with the surfaces of the pulley grooves introduces stresses in the ribs, tending to develop cracks therein.

DISCLOSURE OF INVENTION

The present invention comprehends an improved multiribbed-belt construction eliminating the disadvantages of the prior art belts in a novel and simple manner.

More specifically, the invention comprehends the provision of such a multiribbed power transmission belt including an outer portion having a plurality of transversely spaced, longitudinally extending tensile cords embedded therein, a fabric cover on an outer surface of the outer portion of the belt, a compression section extending inwardly from said outer portion and defining a plurality of laterally spaced, longitudinally extending ribs, each rib having an outer portion formed of a first rubber material and defining inwardly converging planar opposite side surfaces for engaging complementary pulley groove side surfaces, and an inner portion formed of a second rubber having a hardness less than the hardness of the outer portion and defining inwardly converging arcuate opposite side surfaces and an inner tip portion, the outer portion planar side surfaces being tangent to the inner portion arcuate side surfaces respectively at a junction of the outer and inner portions of the compression section ribs.

In a modified form of multiribbed power transmission belt embodying the invention, the planar side surfaces of the outer portion of the ribs intersect the inner portion arcuate side surfaces.

The side surfaces may comprise concentric circular surfaces and the inner tip portion may comprise a circular surface concentric with the side surfaces.

In one form, the tip portion defines an arcuate inner surface and, in another form, the tip portion defines a planar inner surface.

In one embodiment of the invention, the curves defining the circular side surfaces of the compression section inner portion intersect inwardly of the tip portion thereof.

The outer portion of the ribs may include a plurality of transversely extending short fibers.

In the illustrated embodiment, the inner portion of the compression section has a height in the range of approximately 5 to 80% of the height of the rib.

The inner portion of the compression section, in the illustrated embodiment, has a hardness greater than 5° (Shore A) less than that of the outer portion of the compression section.

In the illustrated embodiment, the circular side surfaces have a radius of at least approximately 25 mm.

In the illustrated embodiment, the planar side surfaces of the outer portion of the ribs terminate at the outer end of the arcuate side surfaces of the inner portion.

In one embodiment, the tip portion defines an arcuate inner surface continuous with the arcuate side surfaces of the compression section outer portion.

In one form, the tip portion defines an inner surface intersecting the arcuate side surfaces of the compression section and, in the illustrated embodiment, the inner surface defines a planar surface.

In another form of the invention, the side surfaces and tip portion define a circle centered in the outer portion of the rib.

The power transmission belt structure of the present invention is extremely simple and economical of construction, while yet providing the highly desirable features discussed above.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
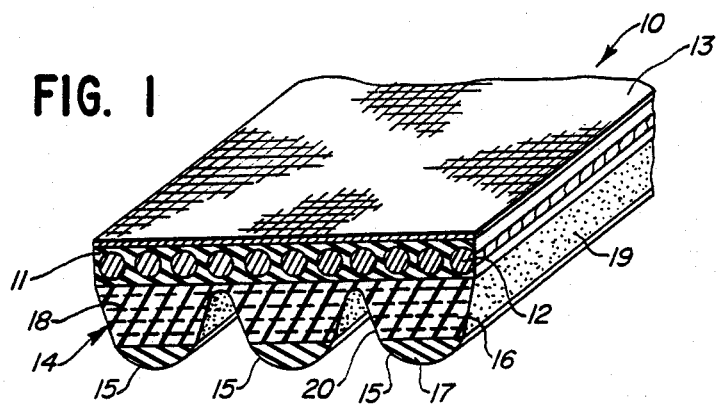
FIG. 1 is a fragmentary sectional perspective view of a power transmission belt embodying the invention.

In the illustrative embodiment of the invention as disclosed in the drawing, a power transmission belt generally designated 10 is shown to comprise a multiribbed belt having an outer belt portion 11 provided with a plurality of transversely spaced, longitudinally extending tensile cords 12. The outer surface of the belt is provided with a fabric cover 13.

The compression section, generally designated 14, of the belt defines a plurality of ribs 15. Each rib includes an outer portion 16 and a distal inner portion 17.

As shown in FIG. 1, the ribs are transversely spaced and extend longitudinally of the belt parallel to the tensile cords 12.

Outer portion 16 of the compression section is provided with a plurality of transversely oriented short fibers 18.

Ribs 15 extend to adjacent the cushion rubber portion 11 and define planar side surfaces 19 and 20 converging inwardly. The included angle between the surfaces 19 and 20 is determined by the pitch and height of the ribs. The angle is normally within the range of 20° to 80° and preferably in the range of 30° to 44°.

The inner portion 17 of each rib preferably has a hardness less than the hardness of the outer portion 16. In the illustrated embodiment, the outer portion 16 has a hardness in the range of approximately 78° to 88° (Shore A), and the inner portion 17 has a hardness in the range of approximately 71° to 81° (Shore A). It is preferred that the difference between the hardness of the two portions 16 and 17 be at least 5° Shore A.

Figure 2:
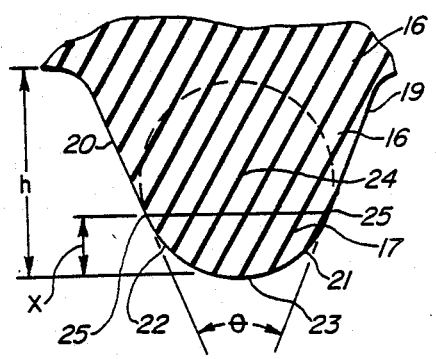
FIG. 2 is a fragmentary enlarged cross section thereof.
Figure 3:
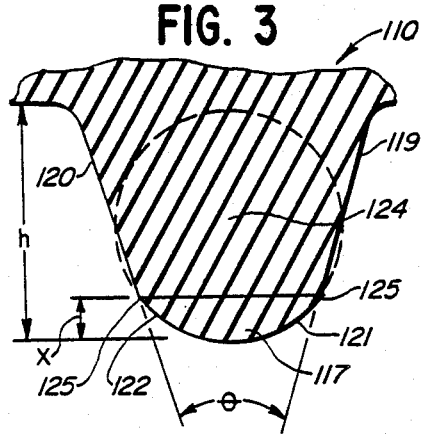
FIG. 3 is a fragmentary enlarged cross section of a modified form for power transmission belt embodying the invention.
Figure 4:
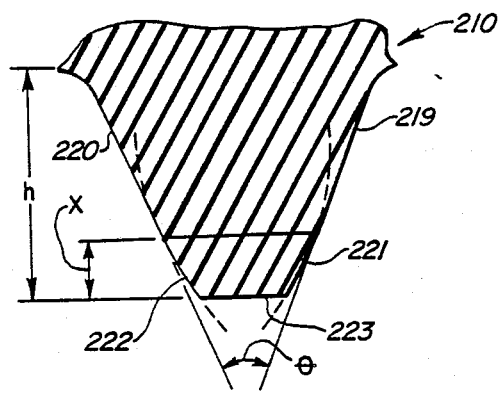
FIG. 4 is an enlarged fragmentary cross section of still another form of power transmission belt embodying the invention.

It is preferred that the height of the inner portion 17 be in the range of approximately 5% to 80% of the height of the ribs, i.e. the ratio of the dimension x to the dimension h in each of FIGS. 2, 3, and 4 be in the range of approximately 5% to 80%.

Where the curvature of the side surfaces of the inner portion of the compression section is circular, it has been found preferable to provide such circular curvature with a radius in the range of approximately 0.5 to 1.1 mm.

In the illustrated embodiment, the cushion rubber layer 11 is formed of one or more of natural rubber, styrene butadiene rubber, chloroprene rubber, and nitrile rubber. The cover fabric comprises a bias canvas, or wide angle canvas, and may include one or more layers.

The tensile cords may be formed of suitable low elongation, high strength fibers, such as polyester, aliphatic polyamide, aromatic polyamide, glass, etc., fibers.

In the illustrated embodiment, the compression section is formed of a rubber similar to that of the cushion rubber section.

The inner portion 17 of the compression section defines arcuate side surfaces 21 and 22 and a tip surface 23 at the distal inner end of the inner portion 17. In FIG. 2, the side surfaces 21 and 22 are circular about an axis 24 centered on the vertical centerline of outer portion 16. The planar side surfaces 19 and 20 of the outer portion 16 of the compression section are tangent to the circular side surfaces 21 and 22 at a junction point 25, as shown in FIG. 2.

As further illustrated in FIG. 2, the tip surface 23 may be circular coaxially of axis 24 and, thus, the surfaces 21, 22, and 23 cooperatively define a circular arc centered on axis 24 and extending inwardly from the junction points 25 at the inner end of the converging planar side surfaces 19 and 20 of the outer portion of the compression section.

Referring to the embodiment of FIG. 3, the belt construction generally designated 110 illustrated therein is shown to comprise a belt construction similar to that of belt 10, but wherein the axis 124 of the circular side surfaces 121 and 122 is displaced outwardly from the position of axis 24 in belt 10 so as to cause the planar side surfaces 119 and 120 of the outer portion of the compression section to intersect the ends of the circular side surfaces 121 and 122 at junctions 125. Resultingly, the height of the inner portion 117 is less than the height of the inner portion 17 of the belt 10.

Another form of power transmission belt generally designated 210 embodying the invention is illustrated in FIG. 4, wherein the belt construction is shown to be similar to belt construction 10, but wherein the arcuate side surfaces 221 and 222 of the inner portion of the compression section have a radius substantially greater than the radius of the side surfaces in belts 10 and 110. The curves defining the surfaces 221 and 222 intersect inwardly of the tip surface 223. Tip surface 223, as shown in FIG. 4, may comprise a planar surface.

The planar side surfaces 219 and 220 of the outer portion of the compression section are tangent to the arcuate surfaces 221 and 222, as shown.

Figure 7:
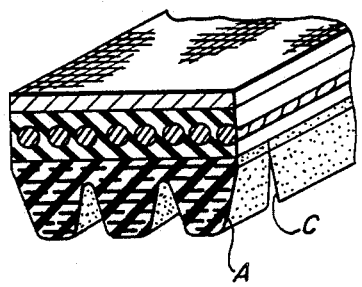
FIG. 7 is a sectional perspective view of a prior art belt.
Figure 8:
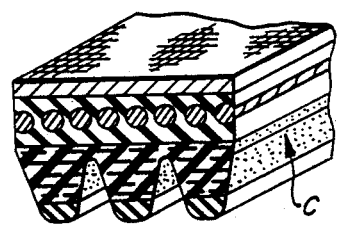
FIGURE 8 is a sectional perspective view of another form of prior art belt.

The prior art belts discussed briefly above are illustrated in FIGS. 7 and 8. As shown in FIG. 7, in one construction, the ribs define fiber-filled compression section portions A. As indicated above, it has been found that such ribbed belt construction tends to crack, such as by the formation of cracks C extending outwardly from the distal end of the ribs.

Figure 9:
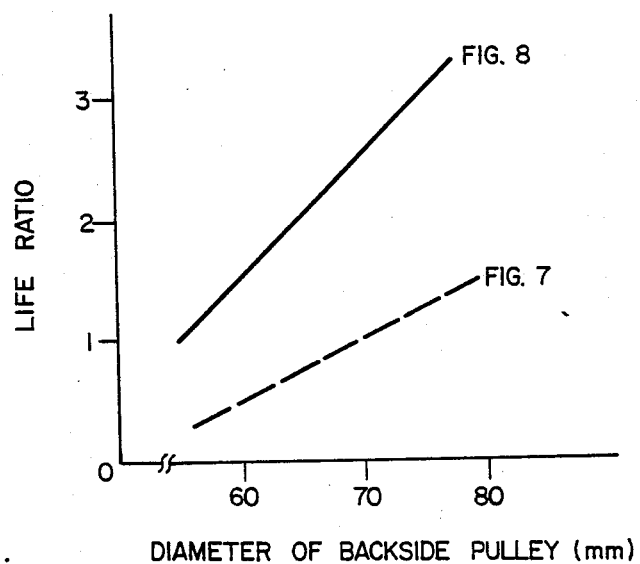
FIG. 9 is a graph showing the relationship between the life ratio and diameter of the backside pulley with respect to the prior art belts of FIGS. 7 and 8.

As further discussed above, it has been proposed that the distal end of the ribs be formed of a softer rubber than that of the outer portion thereof and, as shown in FIG. 8, where such construction is utilized, the cracks C tend to form in the harder rubber outwardly of the softer rubber. As shown in FIG. 9 the useful life of the belt of FIG. 8 is substantially greater than that of the belt of FIG. 7 and varies with the size of the backside pulley, which tends to introduce cracking stresses in the belt when the compression section is placed in tension as it goes about the backside pulley.

Figure 5:
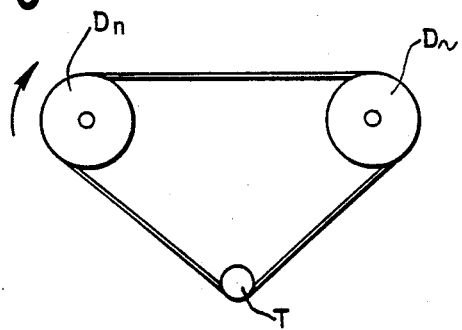
FIGURE 5 is a schematic representation of a testing apparatus for determining the characteristics of the belt.
Figure 6:
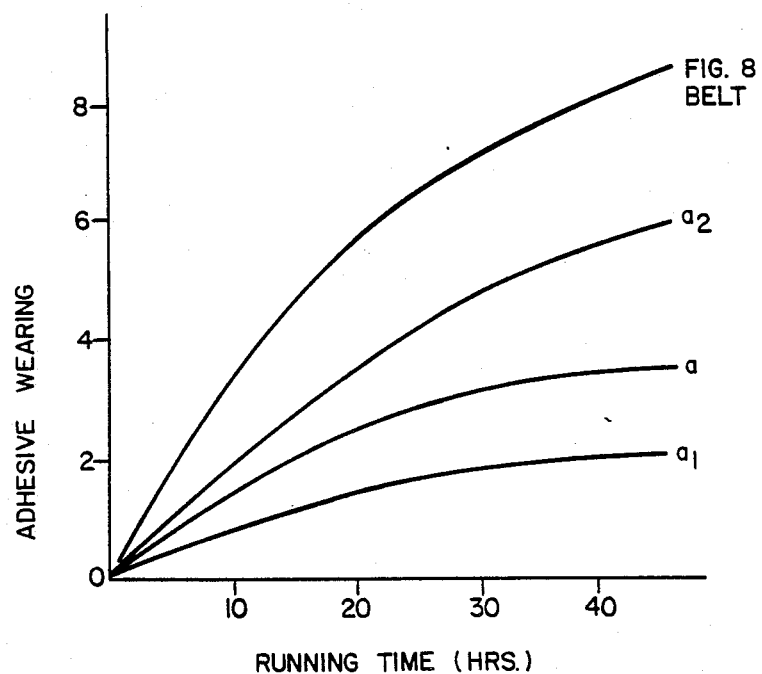
FIG. 6 is a graph illustrating the relationship between the wear and running time of belts embodying the invention compared with a prior art belt illustrated in FIG. 8.

The useful life of the belts of the present invention is substantially greater than that of the belt of FIG. 8, as illustrated in FIG. 6. In determining the characteristics of the belts illustrated in FIG. 6, the belts were run in a testing arrangement, as illustrated in FIG. 5, wherein the belts were trained about a drive pulley Dr, a driven pulley Dn, and a tension pulley T. As shown in FIG. 6, the wear on the FIG. 8 belt was substantially greater than that on three examples of the belt 10 identified as belts A, $A_1$, and $A_2$. The belts so tested comprised belts having 3.6 mm per width, 5.0 mm thickness, and 900 mm length. The inner portion of the belt had a height of 0.8 mm. The drive pulley had a diameter of 120 mm, the driven pulley had a diameter of 120 mm, and the tension pulley had a diameter of 45 mm. The drive pulley was rotated at a speed of 4900 rpm, 12 ps. of load were placed on the driven pulley, surface roughness of each pulley was S12.5 (JIS), and the tests were run at a temperature of 18° C. As shown, the belts of the present invention provide a substantially increased wear, providing an extended useful life thereof.

Figure 10:
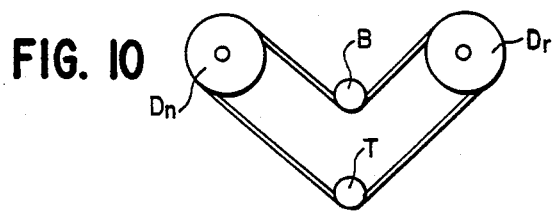
FIG. 10 is a schematic view of a test apparatus for use in determining the life ratio.

Additional tests showing the improved characteristics of the belts of the present invention are illustrated in FIGS. 10-13. As shown in FIG. 10, the belts were tested in a drive system having a driver pulley Dr, a driven pulley Dn, a tension pulley T, and a backside pulley B. Four belts 210 were tested, having respectively circular side surfaces of the inner portion of the compression section of radius 0.5, 0.7, 0.9 and 1.1 mm. Again, the belt had an upper width of 3.6 mm, and a thickness of 5.0 mm., with a length of the belt being 1,270 mm. The drive pulley had a diameter of 120 mm, the driven pulley had a diameter of 120 mm, the tension pulley had a diameter of 45 mm, and the backside idler had a diameter of 75 mm. The drive pulley was driven at 4900 rpm, 14 ps. of load was placed on the driven pulley, the contact angle of the belts on the tension and idler pulley was 190°, and the tests were run at a temperature of 80° C. The initial belt tension was 10 kg. and 30 kg., respectively. The slippage rate of the belt was 2%.

Figure 11:
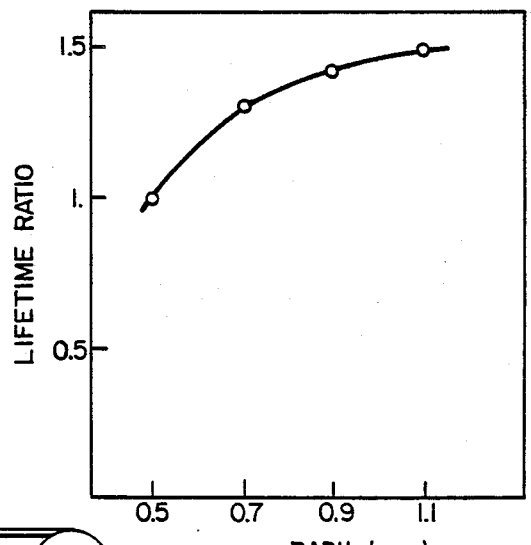
FIG. 11 is a graph illustrating the lifetime ratio to the radii of the power transmission belts of the invention when tested in the apparatus of FIG. 10.

As shown in FIG. 11, the lifetime ratio increased with the increase in the radius of the side surfaces. As shown in FIG. 11, it is preferable that the side surfaces have a relatively large radius to provide improved, long useful life.

Figure 12:
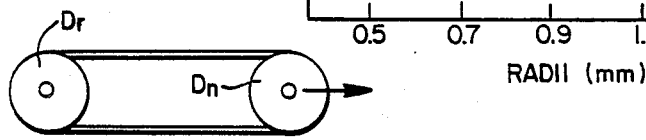
FIG. 12 is a schematic representation of another form of test apparatus for use in testing the belts of the invention.
Figure 13:
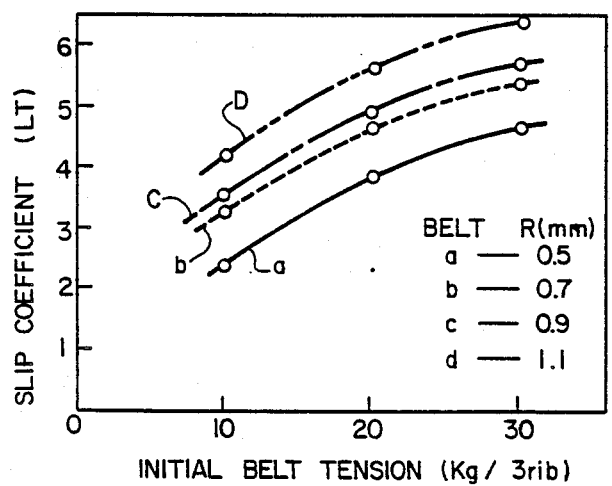
FIG. 13 is a graph illustrating the results of the testing of the belts of the invention having different radii of curvature of the inner portion side surfaces.

The relationship of the slip coefficient, Lt, to the initial belt tension is illustrated in FIG. 13 with respect to power transmission belts embodying the invention having respective radii of 0.5, 0.7, 0.9, and 1.1 mm. In obtaining the data for the graph of FIG. 13, the belt was driven in a test apparatus, as shown in FIG. 12, wherein the driver pulley Dr had a diameter of 80 mm and the driven pulley Dn had a diameter of 110 mm, with the driver pulley being operated at 2000 rpm. The upper width of the belt was 3.6 mm, and the thickness was 5.0 mm, with a circumferential length of the belt being 975 mm. The height of the ribs was 2.5 mm. The contact angle of the belt on the drive pulley was 178°, the initial belt tension was set at 10 kg., 20 kg., and 30 kg. in testing each belt, and the slippage rate of the belt was 2%. The slip ratio Lt was determined by the formula $$Lt = \frac{PS \times 940 \text{ (fixed number)} \times 10^7}{\alpha \times D_r^2 \times M \times N \text{ (number of ribbed)}}$$

The test results illustrated in FIG. 13 indicate that an increase in the radius of the side surfaces of the inner portion of the compression section of the belt provides an increased useful belt life and an ability to transmit larger loads.

Thus, the invention comprehends an improved multiribbed power transmission belt wherein an inner portion of the compression section is formed of a rubber which is softer than the rubber of which the outer portion is formed. The side surfaces of the inner portion are arcuate, converging inwardly. In one form, the side surfaces are circular. The side surfaces of the outer portion of the compression section are planar, converging inwardly, and in one form of the invention, are tangent to the arcuate side surfaces of the inner portion. In an alternative form, the planar side surfaces of the outer portion intersect the arcuate side surfaces of the inner portion.

The distal inner tip of the inner portion, in one form, is circular and may be concentric with the side circular surfaces thereof. In another form, the distal tip surface is planar transversely to the rib.

The belts of the present invention provide an improved, long, troublefree life, with minimized wear of the side surfaces of the compression section and minimize cracking of the ribs.

The provision of the arcuate inwardly converging surfaces of the inner portion of the compression section avoid contact thereof with the pulley surfaces, thereby uniformly dispersing stress in the ribs so as to provide the improved crack resistance and wear characteristics.

The foregoing disclosure of specific embodiments is illustrative of the broad inventive concepts comprehended by the invention.

We claim:

1. A multiribbed power transmission belt comprising:
   an outer portion having a plurality of transversely spaced, longitudinally extending tensile cords embedded therein;
   a fabric cover on an outlet surface of said outer portion of the belt; and
   a compression section extending inwardly from said outer portion and defining a plurality of laterally spaced, longitudinally extending ribs, each rib having an outer portion formed of a first rubber material and defining inwardly converging planar opposite side surfaces for engaging complementary pulley groove side surfaces, and an inner portion formed of a second rubber having a hardness less than the hardness of said outer portion and defining inwardly converging circular opposite side surfaces and an inner tip portion, said outer portion planar side surfaces being tangent to said inner portion circular side surfaces respectively at a junction of said outer and inner portions of said compression section ribs,
   said inner tip portion defining an arcuate inner surface which contributions to the resistance of the belt ribs to wear and cracking.

2. A multiribbed power transmission belt comprising:
   an outer portion having a plurality of transversely spaced, longitudinally extending tensile cords embedded therein;
   a fabric cover on an outer surface of said outer portion of the belt; and
   a compression section extending inwardly from said outer portion and defining a plurality of laterally spaced, longitudinally extending ribs, each rib having an outer portion formed of a first rubber material and defining inwardly converging planar opposite side surfaces for engaging complementary pulley groove side surfaces, and an inner portion formed of a second rubber having a hardness less than the hardness of said outer portion and defining inwardly converging circular opposite side surfaces and an inner tip portion, said outer portion planar side surfaces intersecting said inner portion circular side surfaces respectively at a junction of said outer and inner portions of said compression section ribs,
   said inner tip portion defining an arcuate inner surface which contributes to the resistance of the belt ribs to wear and cracking.

3. The power transmission belt of claims 1 or 2 wherein said opposite circular side surfaces of each rib compression section inner portion are concentric.

4. The power transmission belt of claims 1 or 2 wherein said opposite circular side surfaces of each rib compression section inner portion are concentric and the surface of said inner tip portion is circular concentrically therewith.

5. The power transmission belt of claims 1 or 2 wherein said inner portion of the compression section has a hardness greater than 5° (Shore A) less than that of said outer portion thereof.

6. The power transmission belt of claims 1 or 2 wherein said circular side surfaces of said inner portion of the compression section have a radius of at least approximately 0.5 mm.

7. The power transmission belt of claims 1 or 2 wherein the curves defining said circular side surfaces of the compression section inner portion intersect inwardly of said tip portion thereof.

8. The power transmission belt of claims 1 or 2 further including a plurality of transversely extending short fibers distributed in said outer portion of the compression section.

9. The power transmission belt of claims 1 or 2 wherein said inner portion of the compression section has a height in the range of approximately 5 to 80% the height of the rib.

10. A multiribbed power transmission belt comprising an outer portion having a plurality of transversely spaced, longitudinally extending tensile cords embedded therein;

a fabric cover on an outer surface of said outer portion of the belt; and a compression section extending inwardly from said outer portion of the belt and defining a plurality of laterally spaced, longitudinally extending ribs, each rib having an outer portion formed of a first rubber material and defining inwardly converging planar opposite side surfaces for engaging complementary pulley groove side surfaces, and an inner portion formed of a second rubber having a hardness less than the hardness of said outer portion and defining inwardly converging arcuate opposite side surfaces and an inner tip portion, said outer portion planar side surfaces terminating at said inner portion arcuate side surfaces respectively, said inner tip portion defining an arcuate inner surface which contributes to the resistance of the belt ribs to wear and cracking.

11. The power transmission belt of claim 10 wherein said tip portion defines an inner surface intersecting said arcuate side surfaces of the compression section.

12. The power transmission belt of claim 10 wherein said side surfaces and tip portion of said inner portion of the compression section define a circle centered in said outer portion thereof.

13. The power transmission belt of claim 10 wherein said arcuate inner surface of the inner tip portion is continuous with said arcuate side surfaces of the compression section outer portion.

* * * * *